United States Patent
Martfeld

(10) Patent No.: US 10,474,778 B2
(45) Date of Patent: Nov. 12, 2019

(54) SYSTEMS AND METHODS FOR TOP LEVEL INTEGRATED CIRCUIT DESIGN

(71) Applicant: Mellanox Technologies Ltd., Yokneam (IL)

(72) Inventor: Alexander Martfeld, Natania (IL)

(73) Assignee: Mellanox Technologies Ltd., Yokneam, IL (US)

( * ) Notice: Subject to any disclaimer, the term of this patent is extended or adjusted under 35 U.S.C. 154(b) by 39 days.

(21) Appl. No.: 15/829,216

(22) Filed: Dec. 1, 2017

(65) Prior Publication Data

US 2019/0171783 A1    Jun. 6, 2019

(51) Int. Cl.
*G06F 17/50* (2006.01)

(52) U.S. Cl.
CPC ...... *G06F 17/5045* (2013.01); *G06F 17/5072* (2013.01); *G06F 17/5077* (2013.01); *G06F 2217/02* (2013.01); *G06F 2217/06* (2013.01)

(58) Field of Classification Search
CPC ........... G01R 31/318314; G06F 17/505; G06F 17/5045; G06F 17/5068; G06F 17/5077
USPC .......................................... 716/106, 102–104
See application file for complete search history.

(56) References Cited

U.S. PATENT DOCUMENTS

| | | | |
|---|---|---|---|
| 2008/0263486 A1* | 10/2008 | Alexanian | G01R 31/318314 716/106 |
| 2009/0007034 A1* | 1/2009 | Granovsky | G06F 17/505 716/106 |
| 2012/0233577 A1* | 9/2012 | Chandra | G06F 17/505 716/105 |

* cited by examiner

*Primary Examiner* — Paul Dinh
(74) *Attorney, Agent, or Firm* — Finnegan, Henderson, Farabow, Garrett & Dunner, LLP

(57) ABSTRACT

Methods and systems for designing an integrated circuit device are described. The method includes receiving RTL descriptions of the whole device and generating lower level component descriptions. The method further includes grouping the component descriptions into blocks, analyzing the component descriptions, and identifying block internal removable components based on the analysis. The method further includes removing the removable components. Reduced design is converted into gate-level descriptions. Finally, the method includes executing high quality and high efficiency device TOP level physical implementation and generation of physical and timing constrains for block level design.

9 Claims, 6 Drawing Sheets

SYSTEMS AND METHODS FOR TOP LEVEL INTEGRATED CIRCUIT DESIGN

TECHNICAL FIELD

The present disclosure relates generally to the field of integrated circuit (IC) design. Specifically, the disclosed methods and systems relate to "physical implementation," that includes synthesis, placement, and routing process.

BACKGROUND

The challenges facing the electronics design community today are significant. Advances in semiconductor technology have increased the speed and complexity of designs in tandem with growing time-to-market pressures. Electronic design automation (EDA) tools have evolved to handle the increasingly complicated task of designing, laying out, and verifying integrated circuit (IC) semiconductor devices ("chips"). In EDA, computers are extensively used to automate the design, layout and verification process. However, improvements in efficiency and quality are still desired.

In integrated circuit design, the logic function of a chip is modeled and simulated in register transfer level (RTL) languages such as "Very High Speed Integrated Circuit Hardware Description Language" (VHDL) or Verilog. Then, a "netlist," that is, a description of the connectivity of an electronic circuit is generated by a compiler using a standard-cell library. A standard cell is a group of transistors and interconnect structures that provides a Boolean logic function (e.g., AND, OR, XOR, XNOR, inverters, etc.) or a storage function (e.g., flipflop, latch, etc.). Based on the netlist, the physical layout of a chip is then generated by mapping RTL descriptions into an actual geometric representation of all electronics devices (e.g., logic gates, capacitors, transistors, etc.) that will be implemented on the chip.

Traditional IC design flow clearly separated the logical front-end flow from the physical back-end flow. Physical back-end flow involves application-specific integrated circuit (ASIC) partition to several blocks and top level design which interconnects these blocks. The partitioning is desirable in order to facilitate hierarchical distributed ASIC implementation. Top level design and block partitioning may be implemented in parallel using separate resources and be limited to a physical size that can be handled by automatic EDA tools in terms of CPU run time and memory requirement.

With no block level physical view of the design, conventional top level full-chip physical implementation was based on timing calculations from relatively basic estimates of interconnections between portions of the design. This often resulted in multiple physical implementation iterations for timing closure, that is, a process of modifying the design to meet the timing requirements. Such iterations may cause inefficiency in backend flow that may delay the scheduled manufacture time. Furthermore, the lack of ability to utilize static timing analysis (STA) during top level implementation process, that is, a method of computing the expected timing of a digital circuit based on advanced electricity algorithms, may result in a lower quality design. Therefore, improvements to increase design efficiency and quality is desired.

Specifically, there are two problems that the IC design industry is facing: inefficiency and low quality. In ASIC design, the bottom-up backend design flow makes the design flow inefficient. And, there are many top to block level iterations for timing closure, resulting in tape out schedule bottlenecks. This often leads to inefficiency. Furthermore, manual and script based timing-blind top level implementation flow without STA algorithms and optimization abilities utilization may result in overdesign and low product quality, meaning suffering from penalty in terms of optimizing area, power, or yield. Therefore, improvements to increase design efficiency and quality is desired.

SUMMARY

This disclosure generally relates to IC design method in physical implementation phase, which includes synthesis, placement, and routing process.

In some embodiments, a computing device may receive register transfer level (RTL) descriptions of an integrated circuit device; generate descriptions of components and connectivity, based on the RTL descriptions; group the component descriptions into blocks; analyze the component descriptions; based on the analysis, identify removable components in the blocks; remove RTL descriptions of the removable components from the blocks; convert RTL descriptions remaining after the removal into gate level descriptions; and convert the blocks to placement regions and routing blockages.

These and other features, aspects, and advantages of the disclosure are described in more detail below in the detailed description and in conjunction with the following figures.

BRIEF DESCRIPTION OF THE DRAWINGS

The accompanying drawings, which comprise a part of this specification, illustrate several embodiments and, together with the description, serve to explain the principles disclosed herein. In the drawings.

GLOSSARY

ASIC: Application specific integrated circuit, or "chip".

STD cell: Group of transistors and interconnect structures that provides a Boolean logic function and has a physical representation.

RTL: ASIC design logical representation in hardware description language like Verilog or VHDL.

Netlist: ASIC design logical representation in terms of STD cells and nets. First generated in backend flow from RTL design by synthesis tool. Further is modified by other EDA tools, but is still kept functionally equivalent to RTL design.

Flat design: This refers to the whole ASIC logical or physical design including all the logical hierarchies and the physical blocks.

TOP level design: This refers to ASIC TOP level hierarchy logical or physical design excluding physical blocks.

Block design: This refers to logical or physical design of a specific physical block.

Block boundary design: This refers to all the devices and the nets between the external ports of the block and the first boundary sequential cell inside the block including the cell itself.

Timing Driven backend flow for Full Chip (TDFC) design: A new term for the current invention that includes "TOP" design, "Block Boundary" design, and relevant clock and power sources or network elements.

Timing Path: Propagation of signal through a collection of STD cells and nets that connect an output of sequential device to an input of another sequential device.

TOP level Timing Paths: A collection of all timing paths that propagate through TOP level logic.

Placement regions: Physical boundaries where electronic components, circuitry, and logic elements are placed in a chip.

Routing blockages: Physical boundaries where the wires needed to be routed.

DETAILED DESCRIPTION

The disclosed embodiments relate to systems and methods for integrated circuit design. Embodiments of the present disclosure may be implemented using a general-purpose computer. Alternatively, a special-purpose computer may be built according to embodiments of the present disclosure using suitable logic elements.

Figure 1:
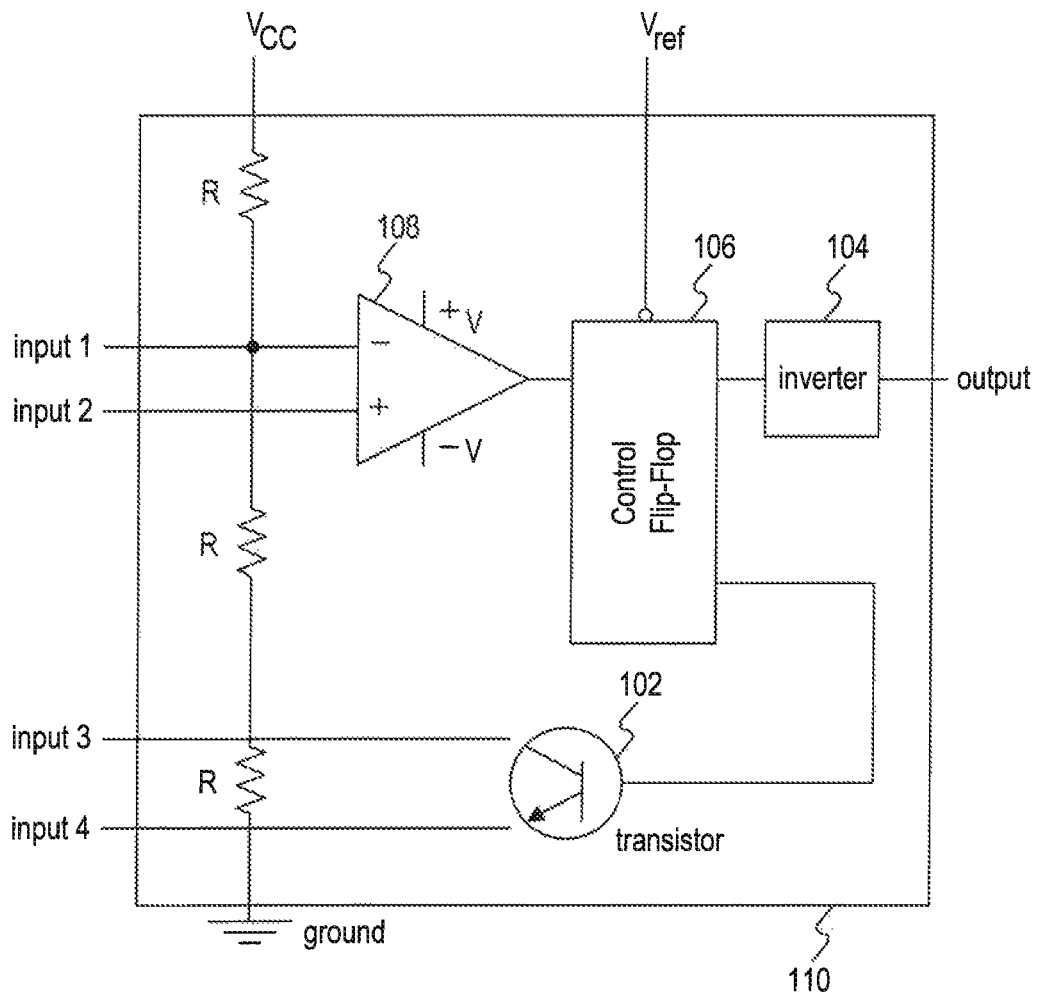
FIG. 1 is a schematic diagram of an exemplary chip.

FIG. 1 is a schematic diagram of an exemplary chip 100. Chip 100 consists of a single block 110. In block 110, there are many components, such as, a transistor 102, a capacitor 108, a control flip-flop 106, and an invertor 104.

Although chip 100 has only a single block, a typical chip of 10^6 to 10^9 standard cells will have multiple blocks. Thus, in a traditional IC design method, the design team partitions the system design into various subsystem and blocks for CPU run time and memory consumption reasons. Different requirements are implemented in each block. When all blocks are complete, they are combined into a system, and then verified to insure desired performance. There are some disadvantages using this method. For example, system level design errors may not be discovered until late in the design cycle and may require costly design iterations.

Figure 2:
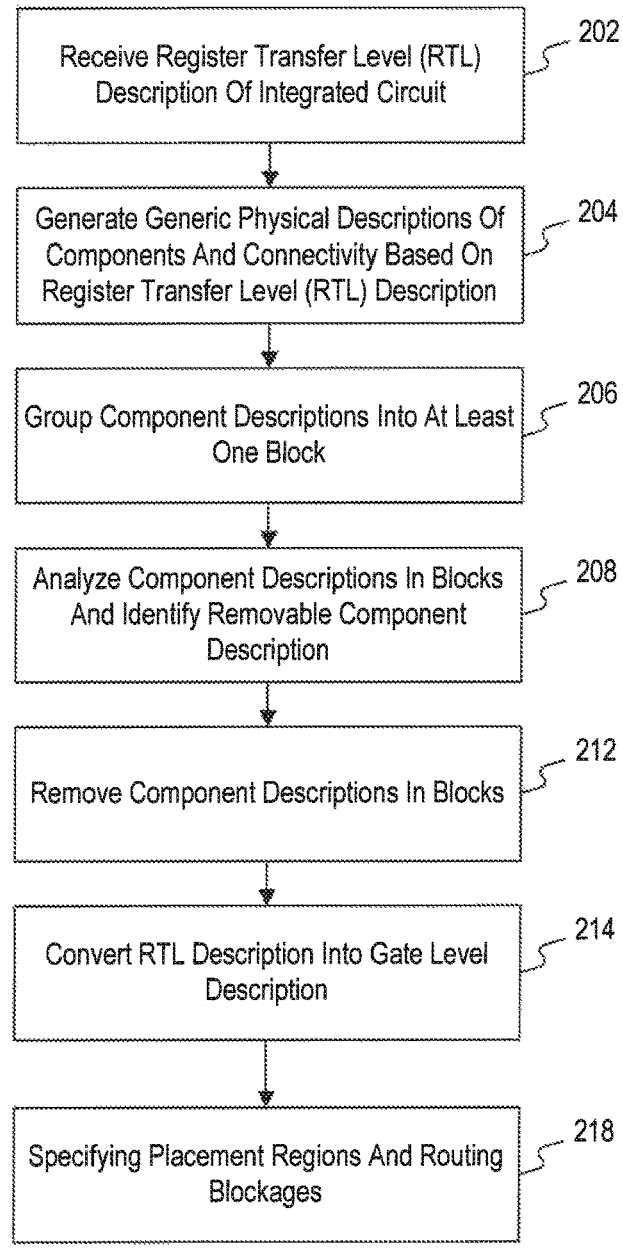
FIG. 2 is a flowchart of an exemplary method for integrated circuit design, consistent with the disclosed embodiments.

FIG. 2 is a flow chart of an exemplary method for integrated circuit design, consistent with the disclosed embodiment. At step 202, an RTL description of a chip is received. RTL description models a chip in terms of the flow of digital signals between hardware registers, and the logical operations performed on those signals.

At step 204, generic physical descriptions of components and connectivity are generated, based on the RTL descriptions.

At step 206, component descriptions are grouped into blocks. For example, a block may include devices such as random access memory (RAM), phase-locked loop (PLL), etc. Referring back to FIG. 1, capacitor 108, control flip-flop 106, transistor 102, invertor 104 may be grouped as block 110.

At step 208, a processor analyzes the component descriptions in the blocks. By investigating connectivity, a processor may determine whether a component in a block would affect "block boundary logic", that is, the logic flow for interconnections between blocks.

Further, a processor identifies components that would not affect block boundary logic in blocks and generates a removable component description. At step 212, a processor removes component descriptions in the blocks and generates a reduced TDFC ASIC design. This step will be discussed in detail in FIG. 3.

At step 214, a processor converts by EDA synthesis tool RTL descriptions of reduced TDFC ASIC design into "gate level descriptions", that is, the lowest-level of IC description, and describes logic gates and interconnections between these gates. Gate level design is input to the next physical implementation stages, such as placement and routing, following by timing verification. Gate level descriptions bring the chip closer to real implementation, and may ensure that a chip will perform precisely to its design requirements.

At step 218, placement regions and routing blockages for internal physical blocks are specified.

Figure 3A:
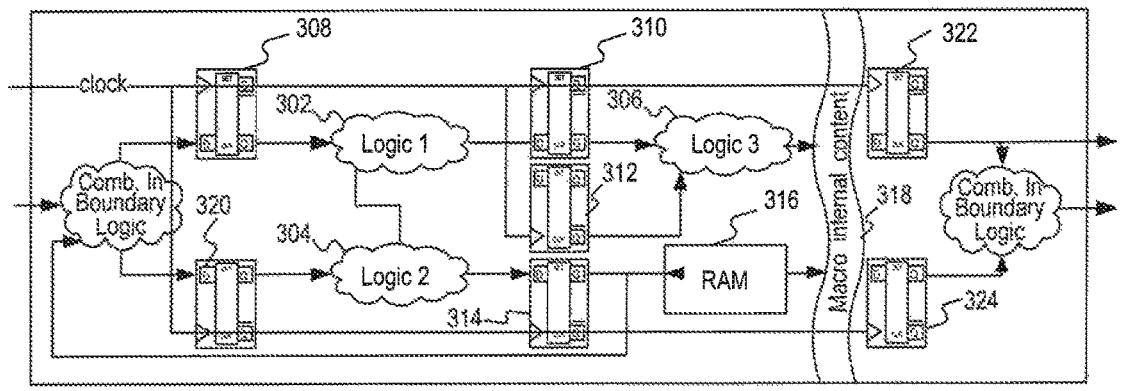
FIGS. 3A and 3B are block diagrams of chips, showing an example of reducing cells in blocks, consistent with the disclosed embodiment.
Figure 3B:
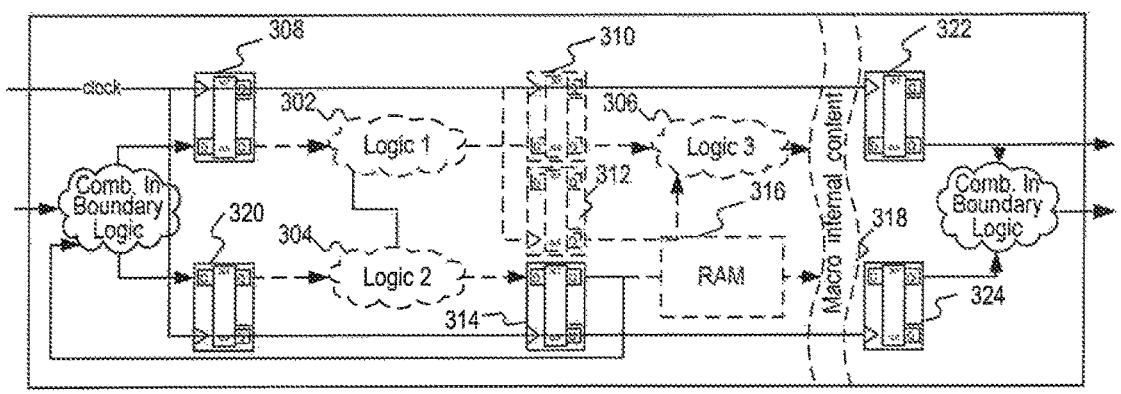

FIGS. 3A and 3B depict the step of removing the components in a block on a chip. In FIG. 3A, a block 300 includes a component 308 such as an inverter, a transistor, a flip flop, etc.; a first logic module 302; a second logic module 304; a third logic module 306; a component 310; a component 312; a component 314; a component 320; a component 322; a component 324; a random access memory (RAM) 316; and a macro internal content 318. A "macro internal content" may contain many other components and/or semiconductor intellectual property (IP) cores, such as PLLs, Digital-to-analog converters, Analog-to-digital converters, etc.

After performance of step 210, components inside a block may be removed if the components do not belong or affect block boundary logic. In FIG. 3B, logic 1 module 302, logic 2 module 304, logic 3 module 306, RAM 316, component 310, component 312, and macro internal content 318 are removed, because they are identified as components that will not affect "block boundary logic", that is, interconnects (including clusters of logic, memories, etc.) between blocks. However, the total number of top level "timing paths", that is, propagation paths of signals through a plurality of components (e.g., standard cell) and wires that connects an output of a block to an input of another block, may stay the same.

In FIG. 3B, only the components that belong to and/or affect block boundary logic remain in block 300, such as, component 308, component 314, component 320, component 322, and component 324. The removed components are shown with broken lines. Furthermore, optimization for timing, area, and power on the timing paths may be performed. By performing this step, the run time and memory consumption of a computer running an EDA tool may be greatly reduced, which may, in turn, enhance the efficiency. This step may be executed by computer running EDA tools.

Figure 4A:
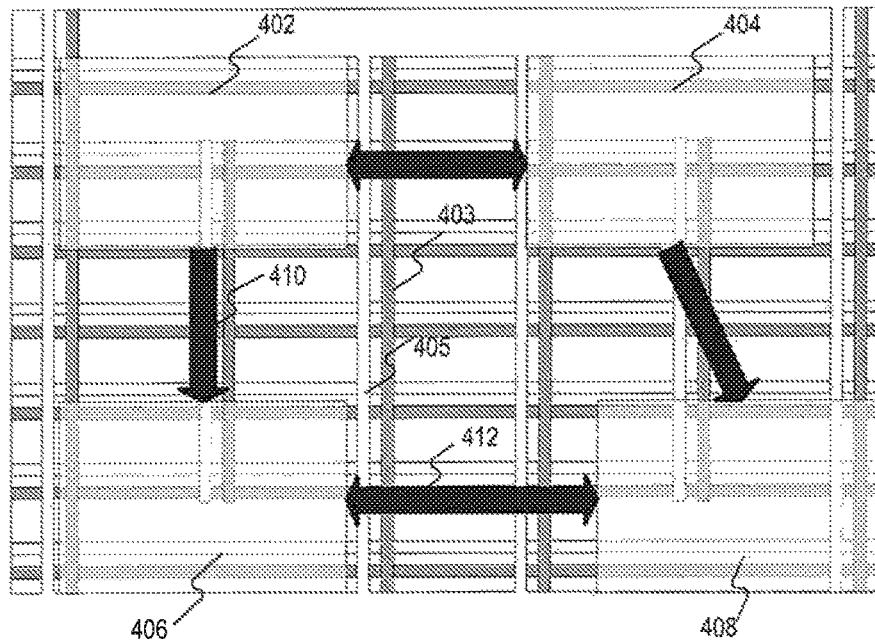
FIGS. 4A and 4B illustrate exemplary "TDFC view", that is, TOP level view with reduced blocks, of the chip in the physical design phase.
Figure 4B:
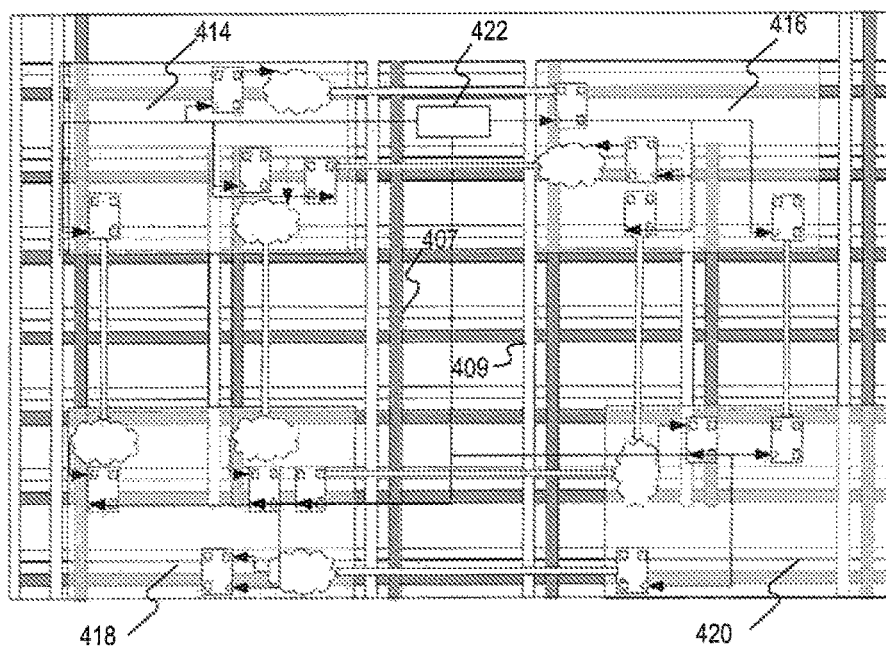
Figure 6:
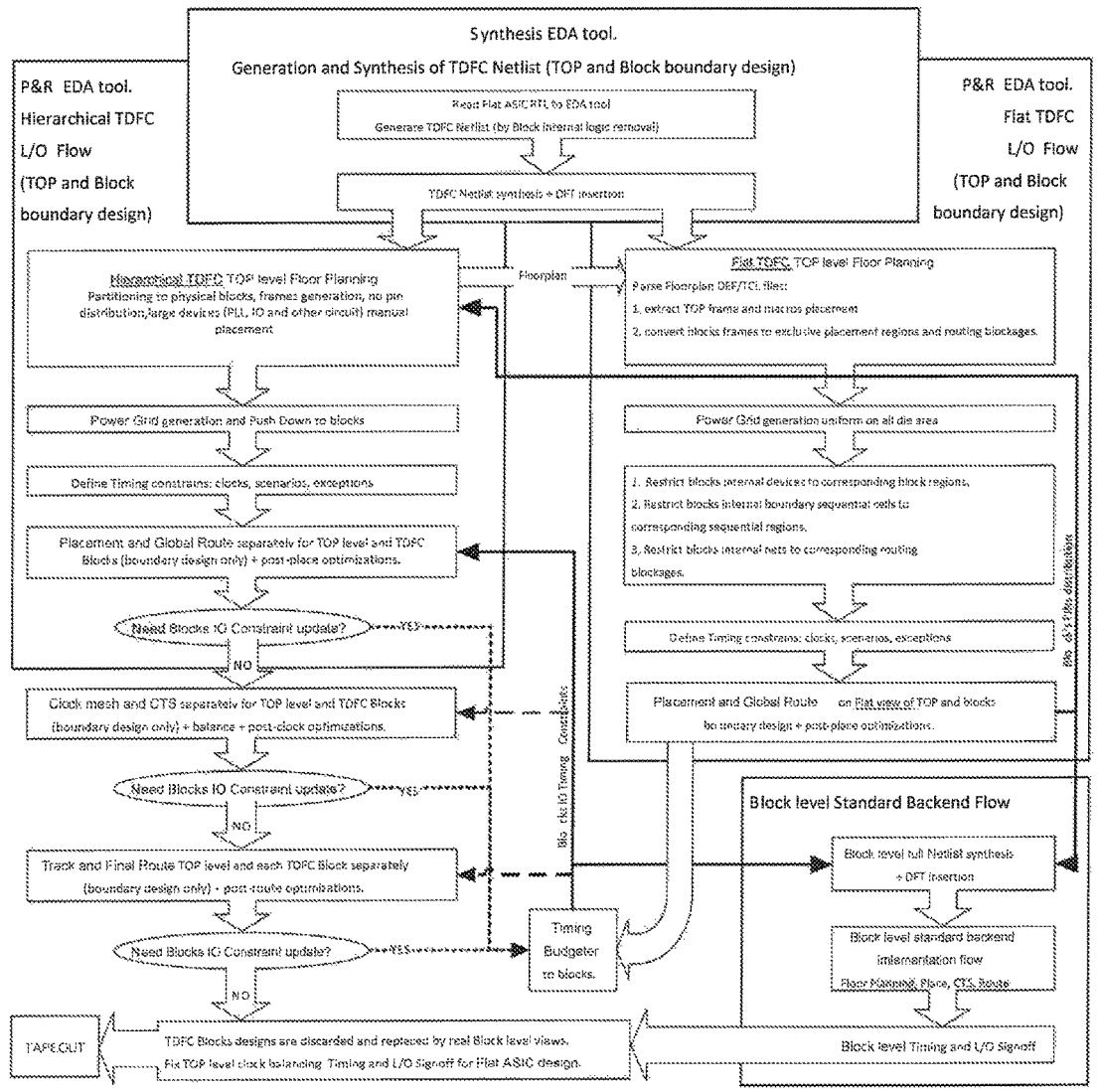
FIG. 6 is a flow chart of both hierarchical and flat approaches.

FIG. 4A and FIG. 4B illustrate an exemplary chip in the physical design phase. There are two approaches for physical design: hierarchical and flat. And, FIG. 6 further describes the flow of the two approaches.

First the hierarchical approach will be described. A first step in this approach is a "floorplan" stage, that is, a schematic representation of the tentative physical placement of major functional blocks of chip being designed. Using the hierarchical approach, the blocks of the chip are modifiable, but they are represented by block frames, which are the light shaded rectangles in FIG. 4A. Block frames are the block boundaries, which do not include the internal components of the blocks. There is thus a need to specify the locations of "pins", that is, physical input/output terminals of the block, in order to progress to the next implementation steps.

On the other hand, using the flat approach, the blocks are represented by placement regions and routing blockages.

There is thus no need to specify the locations of block pins. Block pin locations are therefore derived after a "routing" stage, that is, a stage after "placement" that adds interconnects (wires or printed circuit traces) needed to properly connect the placed components while complying with all design rules for chip being designed.

FIG. 4A illustrates a "floor plan," that is, a physical layout, of a chip 400 using the hierarchical approach. Chip 400 is partitioned into blocks, and block pins are generated, but no routing blockages or placement regions are necessary. Block internal context is constrained for physical design by block frame and pins distribution. For example, in FIG. 4A, a chip 400 has four block frames: 402, 404, 406, and 408, indicated by lightly shaded rectangles, as well as a block pin 410 and a block pin 412. Pins 410 and 412 are shown in FIG. 4A as arrows.

On the other hand, FIG. 4B illustrates a floor plan of another chip using the flat approach. In FIG. 4B, for block internal context physical restriction purpose, a chip 450 is partitioned into placement regions and routing blockages. For example, in FIG. 4B, chip 450 has four blocks: 414, 416, 418, and 420, indicated by lightly shaded rectangles, and a PLL 422. And, according to the RTL descriptions, the blocks are converted into "placement regions", which are regions that will be placed with different components and "routing blockages", which are regions that will be interconnected by wires or traces. In addition, a power grid for the flat approach may be laid on the chip area, including the block areas. In FIGS. 4A and 4B, the power grid is denoted as thick dark lines in chip 400 and chip 450. As shown in FIG. 4A, VDD 403 and VSS 405 are distributed over chip 400. VDD is supplied to the chip by an IC power supply pin that provides a positive voltage, and VSS is supplied to the chip by an IC power supply pin that provides negative voltage. Similarly, in FIG. 4B, VDD 407 and VSS 409 are distributed over chip 450.

After the floorplan has been generated, design criteria require that all components in the blocks be restricted to a pre-defined distance from a block boundary in order to estimate block internal "resistive-capacitive delay", that is, a signal delay of a group of wires and circuits that may be caused by resistive-capacitive effects.

In the case of hierarchical approach as shown in FIG. 4A, placement and routing for each block may be executed separately. Then, in order to improve timing constraints of block interface signals, several physical implementation and timing simulation iterations of blocks via TOP level may be performed. Still these iterations are very light, as are executed on light TDFC design of the block which incorporates blocks boundary logic only. On the other hand, in the case of flat approach, placement and routing are executed in one piece. Thus, optimizations for timing, physical real estate, power, and yield will be performed on all timing paths between blocks at once and no iterations are desirable. Thus higher level of product quality can be achieved by "Flat TDFC" approach. Furthermore, all components in the blocks may be restricted to a region in the corresponding the block floorplan. And, all interconnects will be routed in the routing blockages.

Figure 5:
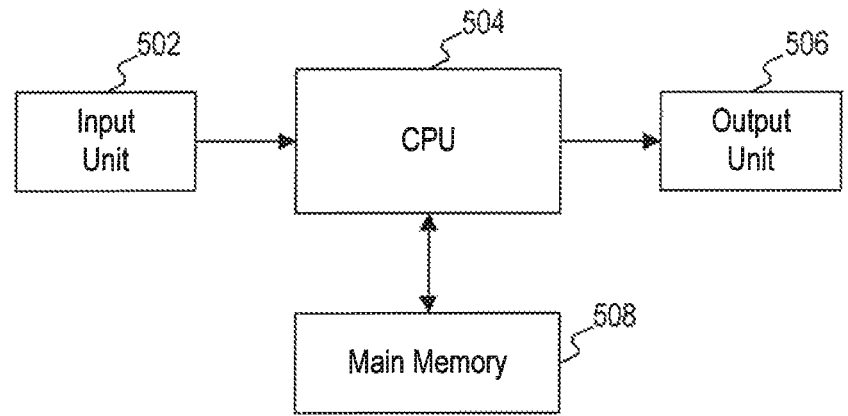
FIG. 5 is a block diagram of a computing system, consistent with the disclosed embodiments.

FIG. 5 is a block diagram of a computing system, consistent with the disclosed embodiments. The computing system 500 includes an input unit 502, a central processing unit (CPU) 504, a main memory 508, and an output unit 506. Input unit 502 may be a keyboard, a mouse, a user interface that is able to receive input information. Input unit 502 is communicatively coupled to CPU 504 to supply input information, such as IC description in RTL, from input unit 502 to CPU 504.

Output unit 506 may be a monitor and/or a display device communicatively coupled to CPU 504 to receive an output signal in the form of electrical signal from CPU 504. Main memory 508 is communicatively coupled to CPU 504 to store data and exchange data with CPU 504.

To complete the method consistent with the disclosed embodiments, CPU 504 may further be configured to execute instructions in memory 508 to generate a netlist based on RTL descriptions. Then, CPU 504 may group the component descriptions into blocks and analyze the component descriptions in the blocks, to determine which components will not affect block boundary logic. After identifying the components that will not affect block boundary logic, CPU 504 may remove the component descriptions in the blocks. Furthermore, CPU 504 may convert RTL description into gate level descriptions, which is the lowest-level of IC description and describes logic gates and interconnections between these gates.

As shown above, timing driven backend flow for full chip (TDFC) design includes: TOP design, block boundary design, block internal design that directly affects block boundary logic. The design view is more compact than ASIC Flat design. Thus, TDFC netlist may be implemented "in one piece" by EDA tools in terms of run time and memory requirements, meaning there is no partitioning required for the process. However, the TDFC design flow may still contain all the required components for timing driven flow as opposed to ASIC TOP design stand alone.

What is claimed is:

1. A top-level integrated circuit design method, comprising:
   receiving register transfer level (RTL) descriptions of an integrated circuit device;
   generating generic physical descriptions of components and connectivity, based on the RTL descriptions;
   grouping the component descriptions into blocks;
   analyzing the connectivity of the component descriptions;
   based on the analysis, identifying components in the blocks, which can be removed with no effect on top-level design, wherein identifying the components includes determining whether a logic flow for an interconnection between the blocks is affected by the components in the blocks;
   in response to a determination that the logic flow for the interconnection between the blocks is unaffected by one or more removable components, removing RTL descriptions of the one or more removable components from the blocks to remove the one or more removable components in the blocks;
   converting RTL descriptions, remaining after the removal, into gate level descriptions by synthesis process; and
   specifying placement regions and routing blockages.

2. The method of claim 1, further comprising updating input and output constraints of the blocks.

3. The method of claim 1, further comprising specifying definition of block place and route area, based on placement regions and routing blockages.

4. The method of claim 1, further comprising generating a code for specifying block pins.

5. The method of claim 1, further comprising storing block boundary logic information in a memory device.

6. The design method of claim 1, further comprising generating signal information by a processing unit.

7. The method of claim 1, further comprising adding interconnects to connect the placed components, while complying with all design rules.

8. A non-transitory computer-readable medium storing instructions which, when executed, causing one or more processors to perform a computerized method for designing top-level integrated circuits, the method comprising:
- receiving register transfer level (RTL) descriptions of an integrated circuit device;
- generating generic physical descriptions of components and connectivity, based on the RTL descriptions;
- grouping the component descriptions into blocks;
- analyzing the connectivity of the component descriptions;
- based on the analysis, identifying components in the blocks, which can be removed with no effect on top-level design, wherein identifying the components includes determining whether a logic flow for an interconnection between the blocks is affected by the components in the blocks;
- in response to a determination that the logic flow for the interconnection between the blocks is unaffected by one or more removable components, removing RTL descriptions of the one or more removable components from the blocks to remove the one or more removable components in the blocks;
- converting RTL descriptions remaining after the removal into gate level descriptions by synthesis process; and
- specifying placement regions and routing blockages.

9. A system for IC top-level physical design, comprising:
- a memory device comprising instructions;
- an input unit;
- an output unit; and
- a processing unit, executing the instructions to:
  - receive register transfer level (RTL) descriptions of an integrated circuit device;
  - generate generic physical descriptions of components and connectivity, based on the RTL descriptions;
  - group the component descriptions into blocks;
  - analyze the connectivity of the component descriptions;
  - based on the analysis, identify components in the blocks, which can be removed with no effect on top-level design, wherein identifying the components includes determining whether a logic flow for an interconnection between the blocks is affected by the components in the blocks;
  - in response to a determination that the logic flow for the interconnection between the blocks is unaffected by one or more removable components, remove RTL descriptions of the removable components from the blocks to remove the one or more removable components in the blocks;
  - convert RTL descriptions remaining after the removal into gate level descriptions by synthesis process; and
  - specify placement regions and routing blockages.

* * * * *

UNITED STATES PATENT AND TRADEMARK OFFICE
CERTIFICATE OF CORRECTION

Page 1 of 1

PATENT NO. : 10,474,778 B2
APPLICATION NO. : 15/829216
DATED : November 12, 2019
INVENTOR(S) : Alexander Martfeld It is certified that error appears in the above-identified patent and that said Letters Patent is hereby corrected as shown below:

On the Title Page

Under the Assignee item (73), please change:
"Mellanox Technologies, Ltd., Yokneam, IL (US)" to --Mellanox Technologies, Ltd., Yokneam, (IL)--.

Signed and Sealed this
Twenty-fifth Day of February, 2020

Andrei Iancu
*Director of the United States Patent and Trademark Office*